Nov. 14, 1967    TATSUSABURO HIBI    3,352,519
PARACHUTE ASSEMBLY FOR AIRCRAFT
Filed Sept. 8, 1965    4 Sheets-Sheet 3

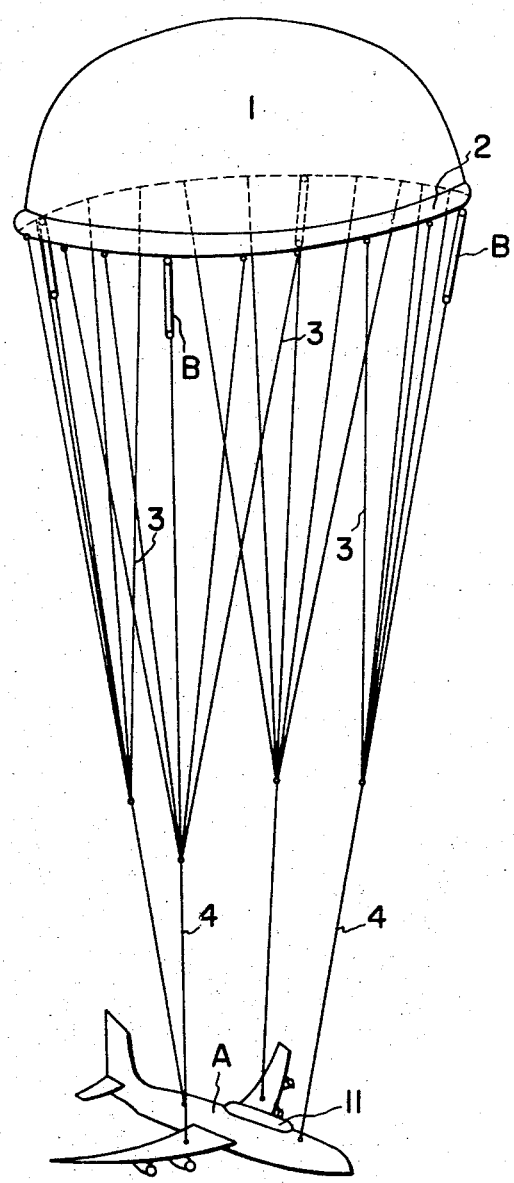

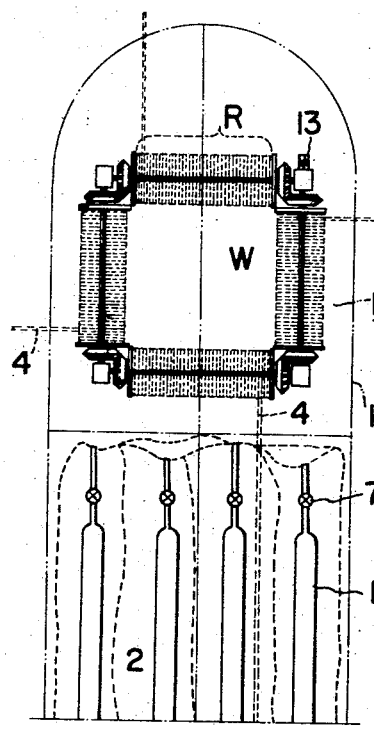
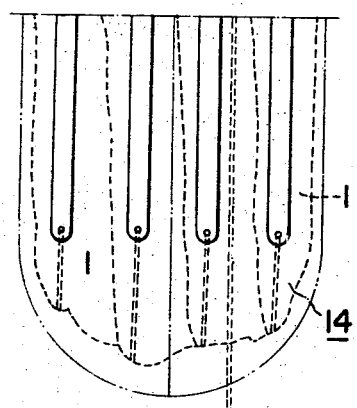
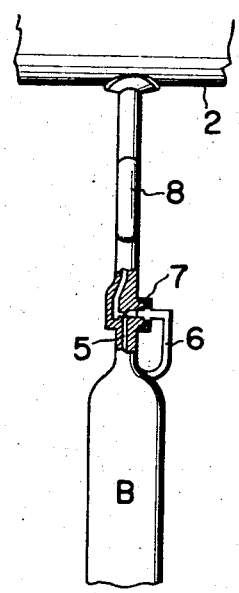
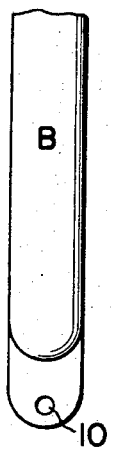
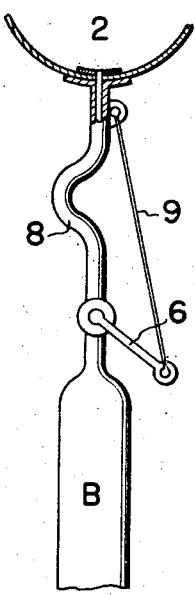
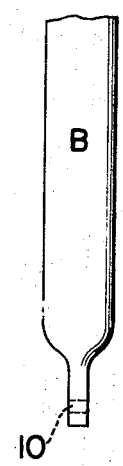

Tatsusaburo Hibi
INVENTOR.

BY Wendleroth, Lind
and Ponack,
Attorneys

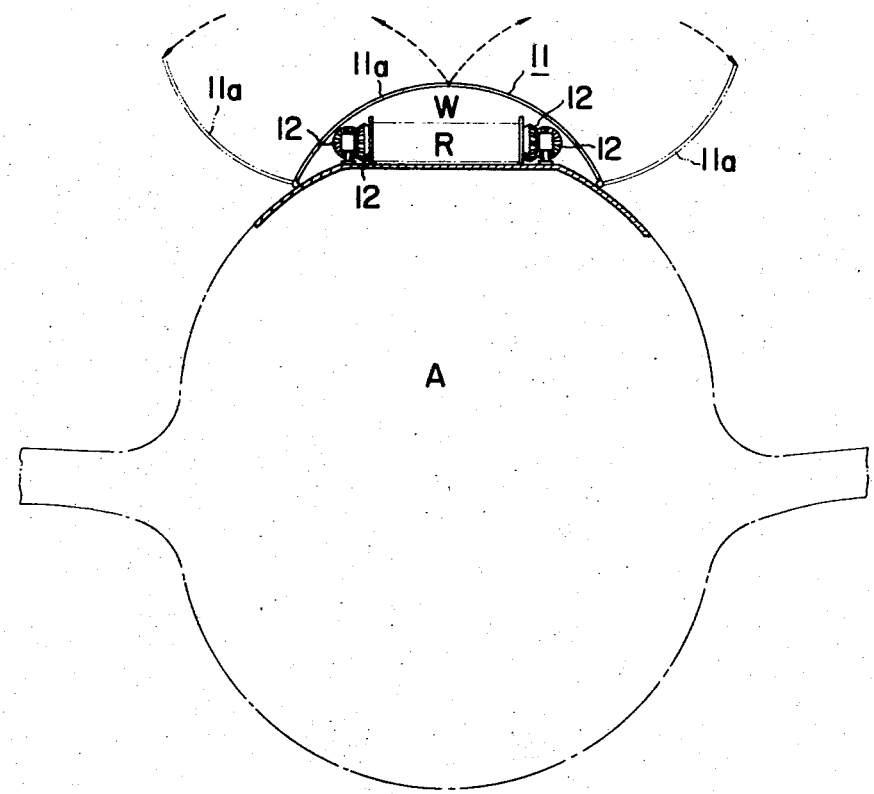

United States Patent Office 3,352,519
Patented Nov. 14, 1967

3,352,519
PARACHUTE ASSEMBLY FOR AIRCRAFT
Tatsusaburo Hibi, 2735 2-chome, Nishisugamo,
Toshima-ku, Tokyo-to, Japan
Filed Sept. 8, 1965, Ser. No. 485,705
Claims priority, application Japan, Apr. 16, 1965,
40/22,633
3 Claims. (Cl. 244—139)

ABSTRACT OF THE DISCLOSURE

A parachute assembly for aircraft, comprising a canopy, an annular flexible tube secured to the outer peripheral edge of said canopy, compressed fluid reservoirs connected to said annular tube and adapted to admit compressed fluid therein into said tube to inflate the latter when the parachute is ejected into the atmosphere, a plurality of groups of shroud lines secured to said flexible tube, each of said groups of lines being connected at the free or lower end to a single suspending line, said load reservoirs being connected between at least some of the shroud lines and said annular tube, valve means between said fluid reservoirs and said annular tube, control means connected to said valve means for opening said valve means when said shrouds and fluid reservoirs are pulled taut between the annular tube and the aircraft, means for connecting the suspending lines to the body of an aircraft, and a housing disposed on the body of aircraft and adapted to enclose therein said canopy, annular tube, shroud lines and suspending lines in folded condition, said housing being adapted to permit the folded canopy, annular tube and shroud lines to be ejected out of the housing in an emergency.

---

This invention relates to a parachute assembly adapted to be installed on the airframes of aircraft and more particularly to a parachute assembly which is installed on the airframes of aircraft and assures safe landing or alighting of the aircraft in emergencies.

In recent years, the reliability of aircraft has been considerably improved due to the development of aeronautical engineering. However, aircraft accidents still occur which result in great loss in human lives and enormous economical loss.

Heretofore, the parachutes of the type to be borne on the backs of persons have been widely used to save human lives. Such parachutes, however, cannot be effective below a certain altitude, and the parachuting is usually accompanied with an intense landing shock and requires considerable skill.

This invention contemplates the installation of a parachute assembly on the body of an aircraft in order to allow the aircraft, in an emergency, to fall at greatly reduced descending speed, thereby ensuring a moderate landing or alighting of the aircraft and preventing loss of human lives as well as damage to the aircraft.

An object of this invention is to provide a parachute assembly to be installed on aircraft, which, when operated, prolongs the length of descending time for the failing aircraft and enables the pilot to search for a suitable landing place.

Another object of this invention is to provide a parachute assembly to be installed on aircraft, in which quick opening of the parachute is attained in the case of an emergency.

Another object of the invention is to provide a parachute assembly to be installed on aircraft, which, when the aircraft alights on the sea, serves as a life-saving craft and as a marker for facilitating detection by rescue parties.

According to a feature of the invention, the parachute includes a canopy having an annular flexible tube secured to the outer peripheral edge thereof, the parachute being stored in folded condition within a storage housing mounted on the body of aircraft. In an emergency, the folded parachute is ejected into the atmosphere, and the folded flexible tube of the canopy is quickly filled with compressed fluid such as argon or hydrogen gas, thus taking its annular form to inflate the canopy into its opened semispherical shape. The source of the compressed fluid is in the form of containers filled with the fluid and connected to the flexible tube through valves which open in an emergency. These containers may take an elongated tubular shape and form a portion of shroud lines so that they can be received, with the folded parachute, within the storage housing.

According to the present invention, briefly stated, there is provided a parachute assembly for aircraft, comprising a canopy, an annular flexible tube secured to the outer peripheral edge of said canopy, compressed fluid reservoirs connected to said annular tube and adapted to admit compressed fluid therein into said tube to inflate the latter when the parachute is ejected into the amosphere, a pluraliy of groups of shroud lines secured to said flexible tube, each of said groups of lines being connected at the free or lower end to a single suspending line, means for connecting the suspending lines to the body of an aircraft, and a housing disposed on the body of aircraft and adapted to enclose therein said canopy, annular tube, shroud lines and suspending lines in folded condition, said housing being adapted to permit the folded canopy, annular tube and shroud lines to be ejected out of the housing in an emergency.

Other features of the invention will be apparent from the following detailed description of a preferred embodiment of the invention, taken in connection with the accompanying drawings in which like parts are designated by like reference numerals and characters, and in which:

FIG. 1 is a perspective view illustrating the parachute according to the invention in inflated condition;

FIG. 2 is a plan view showing a parachute storage housing filled with the folded parachute and a suspending line winding assembly disposed within the housing;

FIG. 3 is a fragmentary view, partly in section, of a compressed fluid reservoir and a flexible connector pipe connecting the reservoir to a flexible tube;

FIG. 4 is a fragmentary side view of FIG. 3, showing a mechanism for opening a valve interposed between the fluid reservoir and flexible pipe;

FIG. 7 is an elevational view showing the winding assembly mounted on the fuselage of an aircraft.

Figure 5:
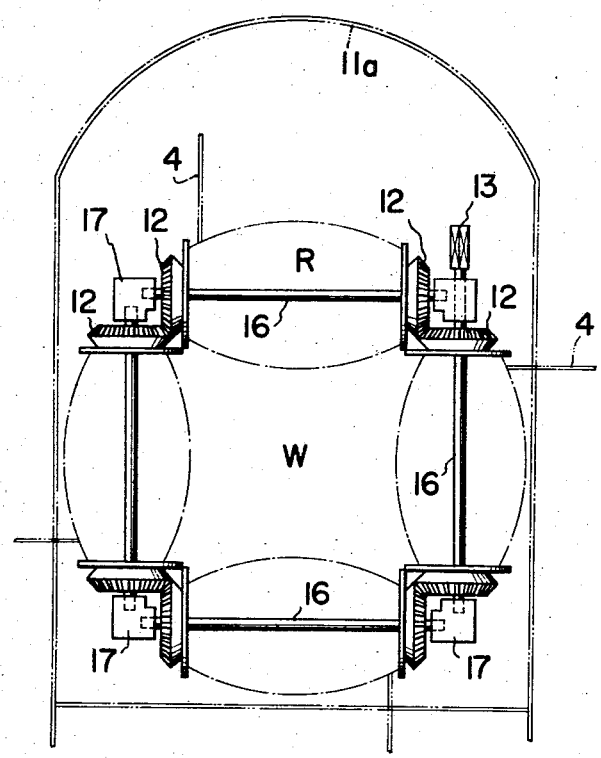
FIG. 5 is a plan view of a suspending line winding assembly enclosed within the housing.

Referring now to FIG. 1, the parachute comprises a canopy 1 made of suitable cloth and having an annular flexible tube 2 secured to the outer peripheral edge thereof. The annular flexible tube 2 has secured to the lower surface thereof a plurality of shroud lines 3 arranged in equally spaced relation along the tube. The shroud lines 3 are divided into four groups each consisting of adjacent several shroud lines. The lowermost or free ends of the shroud lines 3 in each group are gathered to each other and connected to a single suspending line 4 which is adapted to be connected to the body of an aircraft A in a manner as will hereinafter be described in detail.

As shown in FIG. 1, compressed fluid reservoirs B of tubular shape are connected to the under surface of the annular flexible tube 2, each of the reservoirs B being joined at its lower end to one of the shroud lines 3 of each group to indirectly connect the annular tube 2 to the shroud line 3. Although FIG. 1 shows four reservoirs, the number of these reservoirs may be suitably selected.

FIGS. 3 and 4 show the details of the reservoir B. The body of the reservoir B may be made of a light material of high strength, such as aluminium or polycarbonate resin and has an outlet 5 provided with a valve 7. The outlet 5 is connected to the annular tube 2 through a flexible connector pipe 8. The valve 7 controls the communication between the resevoir B and tube 2 and has a rotatable valve body with a control arm 6 rigidly secured thereto and radially extending therefrom. The free end of the control arm 6 is connected with one end of a cord 9, the other end of which is fastened to portion of the flexible pipe 8 adjacent the annular tube 2. In the position of the control arm 6 as shown in FIG. 4, the valve 7 is in closed state, and it is preferably set so as to be opened by rotation of the arm 6 and therefore the valve body through an angle of about 30 degrees toward the annular tube 2. The resevoir B has in the lower end thereof an opening 10 through which the shroud line 3 may be passed to be connected thereto.

Referring to FIG. 7, the aircraft body A has on the upper surface thereof a parachute storage housing 11, which, in the embodiment shown, includes a pair of cover plates 11a pivotally connected to the aircraft body A at outer edges thereof and having inner edges thereof in abutting engagement. In the solid line position of the plates 11a, they form a closed housing 11, and in open state of the housing they take the phantom line position.

Referring to FIG. 2, the rear part of the housing 11 forms a parachute storage chamber 14 in which the parachute including the canopy 1, annular tube 2, fluid reservoirs B and shroud lines 3 is stored in folded condition. The front part of the housing 11 forms a front chamber 15 in which is positioned a winding assembly W.

Figure 6:
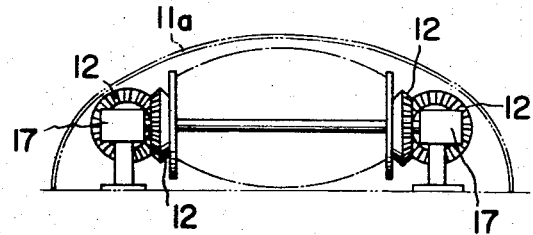
FIG. 6 is an elevation of FIG. 5.

As shown in FIGS. 5 and 6, the winding assembly W includes four rotatable shafts 16 arranged in a square form and each journalled at both ends thereof in bearings 17 mounted on the aircraft body A. On the shafts 16 are rigidly carried winding reels R each having on opposite sides thereof a pair of bevel gears 12. The adjacent gears 12 of the adjacent winding reels R are in mesh with each other. One of the shafts 16 extends through and beyond the bearing 17 and terminates in a square end 13 adapted to be received in a hand tool for the rotation of the shaft 16. Thus, it will be apparent that the rotation of the square end 13 causes all the reels to rotate at the same speed. The winding reels R are adapted to wind up the base end portions of the suspending lines 4 as shown in FIGS. 2 and 5. The suspending lines 4 are introduced into a body A through front and rear portions of the body and through the wings, as shown in FIG. 1, and suitably led through the body A to the winding reels R to be secured to the latter in the directions shown in FIGS. 2 and 5.

In order to store the parachute within the storage housing 11, the square end 13 of the shaft 12 is rotated by a hand tool in the direction to wind the suspending lines 4 about the reels R, and the parachute including the canopy 1, tube 2, reservoirs B and shroud lines 3 is placed within the rear chamber of the housing 11 with these members folded in the state shown in FIG. 2. In this stored condition, the flexible pipes 8 connecting the outlets 5 of the reservoirs B with the flexible tube 2 are bent as shown in FIG. 4 and the control arms 6 are set in the position shown in FIG. 4 thus closing the valves 7, with the cords 9 in straight condition.

In an emergency, the engine or engines of aircraft are stopped to prevent the discharge of combustion heat, while the cover plates 11a of the housing are opened by suitable means as shown by the phantom line in FIG. 7, and at the same time the parachute including the canopy 1 and so on is ejected into the atmosphere, for example, by spring means. When the parachute is ejected, the flexible pipes 8 are straightened to pull or rotate the control arms 6 through the cords 9 with the result that the valves 7 are opened to admit the compressed fluid such as argon or hydrogen gas to flow from the reservoirs B through the pipes 8 into the annular flexible tube 2. Thus, the tube 2 is quickly filled with the fluid to take its expanded annular shape, thereby causing the canopy 1 to be inflated into its operative form.

The inflated canopy will retard the aircraft and assist in moderating the falling speed of the same, the suspending lines serving to ensure a stable fall of the aircraft. When such a condition is obtained, the pilot may restart the engine or engines, if in order, to search for a safe landing place or alighting water surface. The annular tube 2 will serve, when the aircraft alights on the sea, as a life-saving boat as well as a marker for facilitating detection by rescue parties.

While I have described a preferred embodiment of the invention, it will be understood that the invention is not limited thereto since it may be otherwise embodied within the spirit and scope of the invention, as defined in the following claims.

What I claim is:

1. A parachute assembly for aircraft, comprising a canopy, an annular flexible tube secured to the outer peripheral edge of said canopy, compressed fluid reservoirs connected to said annular tube and adapted to admit compressed fluid therein into said tube to inflate the latter when the parachute is ejected into the amtosphere, a plurality of groups of shroud lines secured to said flexible tube, each of said groups of lines being connected at the free or lower end to a single suspending line, said fluid reservoirs being connected between at least some of the shroud lines and said annular tube, valve means between said fluid reservoirs and said annular tube, control means connected to said valve means for opening said valve means when said shroud lines and fluid reservoirs are pulled taut between the annular tube and the aircraft, means for connecting the suspending lines to the body of an aircraft, and a housing disposed on the body of aircraft and adapted to enclose therein said canopy, annular tube, shroud lines and suspending lines in folded condition, said housing being adapted to permit the folded canopy, annular tube and shroud lines to be ejected out of the housing in an emergency.

2. A parachute assembly for aircraft, comprising a canopy, an annular flexible tube secured to the outer peripheral edge of said canopy, a plurality of groups of shroud lines, each group of said shroud lines being connected at the lower end thereof to a single suspending line, compressed fluid reservoirs of elongated tubular shape each connected at one end thereof to said flexible tube via a valve and then a flexible connector pipe, control arms each adapted to control each of the valves, means connecting each of said arms with a portion of each of said flexible connector pipes adjacent said annular flexible tube, said means allowing said control arms to close said valves when said connector pipes are in bent condition and causing said control arms to move to open said valves permitting the compressed fluid in said reservoirs to flow into said annular tube to inflate said canopy when said connector pipes are forced into straight condition, some of said shroud lines being connected at the upper ends thereof respectively, to the lower ends of said reservoirs, the remainder of said shroud lines being directly connected at their upper ends to said annular tube, means for connecting the suspending lines to the body of an aircraft, and a housnig disposed on the body of the aircraft and adapted to enclose therein said canopy, annular tube, shroud lines and suspending lines in folded condition, said housing being adapted to permit said folded members therein to be ejected out of the housing in an emergency.

3. A parachute assembly for aircraft, comprising a canopy, an annular flexible tube secured to the outer peripheral edge of said capoy, a plurality of groups of shroud lines, each group of said shroud lines being connected at its one or lower end to a single suspending line, compressed fluid reservoir tanks of elongated tubular shape each connected at its one or upper end to said flexible tube via a valve and then a flexible connector pipe, swingable control arms each adapted to control each of the valves, cords connecting the free end of each of said arms with a portion of said flexible connector pipe adjacent said annular flexible tube, said cords allowing said control arms to close said valves when said connector pipes are in bent condition and causing said control arms to swing to open said valves permitting the compressed fluid in said reservoir tanks to flow into said annular tube to inflate said tube and thereby said canopy when said connector pipes are forced into straight condition, some of said shroud lines being respectively connected at their other or upper ends to the other or lower ends of said reservoir tanks, the remainder of said shroud lines being directly connected at their other or upper ends to said annular tube, a housing mounted on the body of an aircraft and adapted to enclose said canopy, annular tube, shroud lines and suspending lines in folded condition, a plurality of winding means provided within said housing and adapted to wind thereon or unwind therefrom said suspending lines at the same speed, said suspending lines passing through the wings and body of aircraft and reaching said winding means, said housing being adapted to be opened to permit said folded members therein to be ejected out of the housing in an emergency.

References Cited
UNITED STATES PATENTS

| | | | |
|---|---|---|---|
| 1,856,397 | 5/1932 | Motter | 244—139 X |
| 2,007,494 | 7/1935 | Coleman | 244—146 |
| 3,107,887 | 10/1963 | Dixon et al. | 244—139 |

MILTON BUCHLER, *Primary Examiner.*

ALFRED E. CORRIGAN, *Examiner.*

R. A. DORNON, *Assistant Examiner.*